United States Patent
Larson

(10) Patent No.: US 8,681,426 B2
(45) Date of Patent: Mar. 25, 2014

(54) STEERABLE NEAR-TO-EYE DISPLAY AND STEERABLE NEAR-TO-EYE DISPLAY SYSTEM

(75) Inventor: Brent D. Larson, Cave Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 209 days.

(21) Appl. No.: 13/289,514

(22) Filed: Nov. 4, 2011

(65) Prior Publication Data

US 2013/0114146 A1    May 9, 2013

(51) Int. Cl.
*G02B 27/14* (2006.01)
*G09G 5/00* (2006.01)

(52) U.S. Cl.
USPC .............................................. 359/632; 345/8

(58) Field of Classification Search
USPC .......... 359/629–632, 641; 351/205, 211, 221, 351/158; 345/7–9
See application file for complete search history.

(56) References Cited

U.S. PATENT DOCUMENTS

| | | | |
|---|---|---|---|
| 4,628,765 A | 12/1986 | Dien et al. | |
| 4,878,393 A | 11/1989 | Duta et al. | |
| 5,334,991 A | 8/1994 | Wells et al. | |
| 5,714,967 A | 2/1998 | Okamura et al. | |
| 5,742,264 A | 4/1998 | Inagaki et al. | |
| 6,043,799 A | 3/2000 | Tidwell | |
| 6,307,526 B1 | 10/2001 | Mann | |
| 6,317,103 B1 | 11/2001 | Furness, III et al. | |
| 6,396,461 B1 | 5/2002 | Lewis et al. | |
| 6,529,331 B2 | 3/2003 | Massof et al. | |
| 6,771,423 B2 | 8/2004 | Geist | |
| 7,130,447 B2 | 10/2006 | Aughey et al. | |
| 7,452,012 B2 * | 11/2008 | Huang | 292/163 |
| 7,457,434 B2 | 11/2008 | Azar | |
| 7,542,210 B2 | 6/2009 | Chirieleison, Sr. | |
| 7,609,229 B2 | 10/2009 | Urakawa | |
| 7,850,306 B2 | 12/2010 | Uusitalo et al. | |
| 8,362,974 B2 * | 1/2013 | Miyake et al. | 345/8 |
| 8,400,371 B2 * | 3/2013 | Kato et al. | 345/8 |
| 8,416,153 B2 * | 4/2013 | Yoshikawa | 345/8 |
| 2006/0119539 A1 | 6/2006 | Kato et al. | |
| 2008/0212195 A1 | 9/2008 | Yamamoto | |
| 2010/0149073 A1 | 6/2010 | Chaum et al. | |

FOREIGN PATENT DOCUMENTS

EP    1202104 A1    5/2002
WO    2006118057 A1    11/2006

OTHER PUBLICATIONS

EP Search Report, EP 12190960.0-1562 dated Feb. 13, 2013.
EP Office Action, EP 12 190 960.0 dated Feb. 27, 2013.

* cited by examiner

*Primary Examiner* — Loha Ben
(74) *Attorney, Agent, or Firm* — Ingrassia Fisher & Lorenz, P.C.

(57) ABSTRACT

A steerable near-to-eye display is provided and may include, but is not limited to, a first curved support arm configured to rotate about a first axis, a second curved support arm configured to rotate about a second axis, and an ocular assembly coupled to at least one of the first curved support arm and the second curved support arm, the ocular assembly configured to display an image and configured to substantially maintain a position where the first curved support arm crosses the second curved support arm.

20 Claims, 6 Drawing Sheets

STEERABLE NEAR-TO-EYE DISPLAY AND STEERABLE NEAR-TO-EYE DISPLAY SYSTEM

TECHNICAL FIELD

The following relates to display systems, and more particularly to a steerable near-to-eye display.

BACKGROUND

Near-to-eye (NTE) display systems are used to display an image to a user at a close proximity to a user's eye. However, typical NTE displays often have a narrow field of view, especially when a compact and lightweight assembly is desired. Field of regard for typical displays is also limited unless the user's head is rotated. Accordingly, it is desirable to provide a NTE display system with a large field of regard without the need to rotate the head each time the instantaneous field of view is moved within the field of regard.

SUMMARY

In accordance with one embodiment, a steerable near-to-eye display is provided. The steerable near-to-eye display may include, but is not limited to, a first curved support arm configured to rotate about a first axis, a second curved support arm configured to rotate about a second axis, and an ocular assembly coupled to at least one of the first curved support arm and the second curved support arm, the ocular assembly configured to display an image and configured to substantially maintain a position where the first curved support arm crosses the second curved support arm.

In accordance with another embodiment, a near-to-eye display system is provided. The near-to-eye display system may include, but is not limited to, a first circular support arm configured to rotate about a first axis, a second circular support arm configured to rotate about a second axis, and an ocular assembly coupled to at least one of the first circular support arm and the second circular support arm, the ocular assembly configured to display an image and configured to substantially maintain a position where the first circular support arm crosses the second circular support arm.

In accordance with yet another embodiment, a near-to-eye display system is provided. The near-to-eye display system may include, but is not limited to, a first partially circular support arm configured to rotate about a first axis, a second partially circular support arm configured to rotate about a second axis, an ocular assembly coupled to at least one of the first partially circular support arm and the second partially circular support arm, the ocular assembly configured to display an image and configured to substantially maintain a position where the first partially curved support arm crosses the second partially curved support arm, a first motor coupled to the first partially circular support arm and configured to rotate the first partially circular support arm about the first axis, a second motor coupled to the second partially circular support arm and configured to rotate the second partially circular support arm about the second axis, and a controller coupled to the first and second motors and configured to control a rotation of the first partially circular support arm and the second partially circular support arm.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

DESCRIPTION OF THE DRAWING FIGURES

Exemplary embodiments will hereinafter be described in conjunction with the following drawing figures, wherein like numerals denote like elements.

DETAILED DESCRIPTION

According to various exemplary embodiments, a steerable near-to-eye display system is provided. The steerable near-to-eye display system may be used in any near-to-eye display application. In some embodiments, for example, the steerable near-to-eye display system may be utilized by a pilot of an aircraft.

Figure 1:
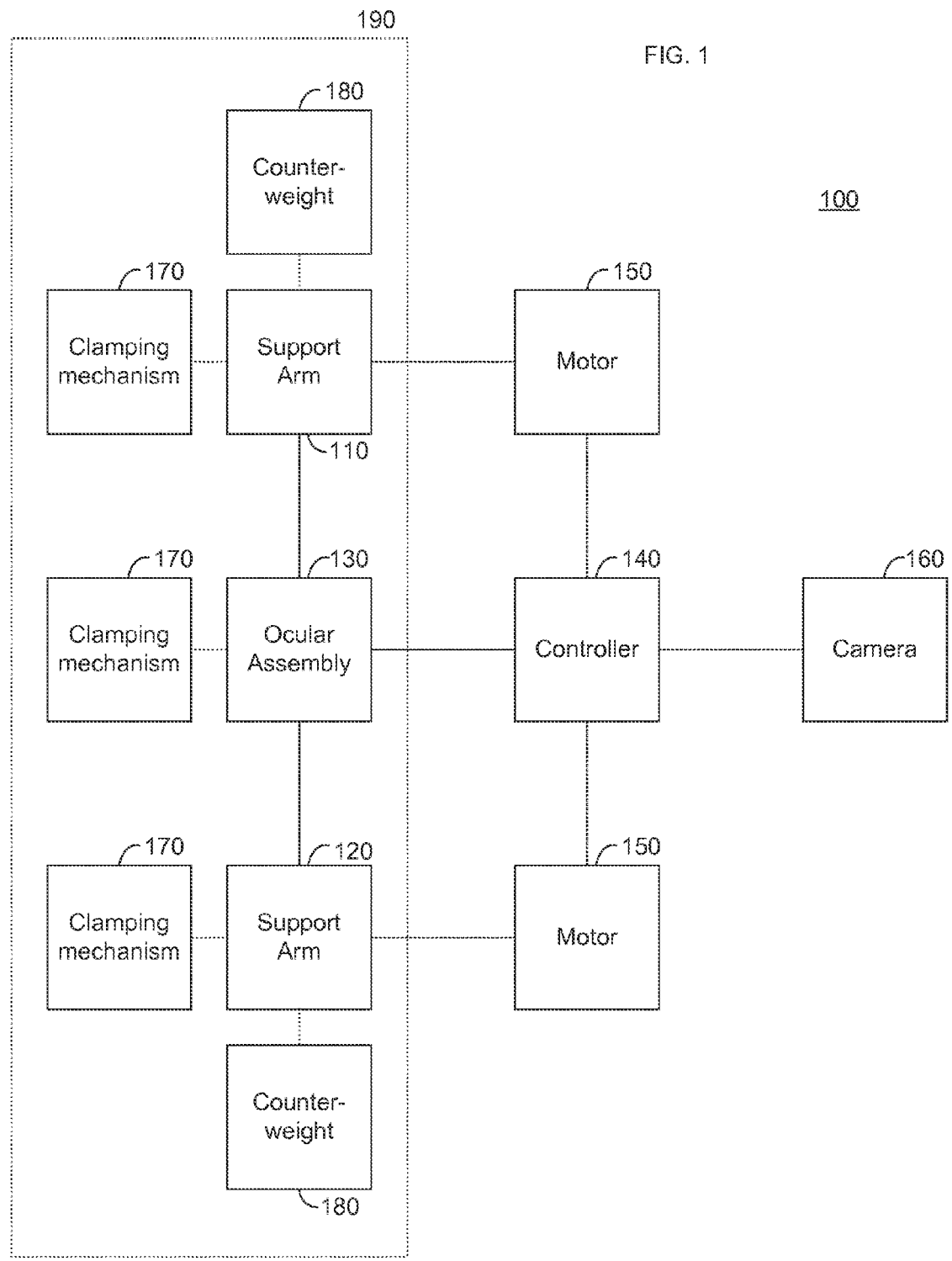
FIG. 1 is a block diagram of an exemplary steerable near-to-eye (NTE) display, in accordance with an embodiment.

FIG. 1 is a block diagram of an exemplary steerable near-to-eye (NTE) display 100, in accordance with an embodiment. The NTE display 100 includes at least two support arms 110 and 120, an ocular assembly 130 and a controller 140. The ocular assembly 130 produces an image to be displayed to a user and is supported by the support arms 110 and 120.

The controller 140 may be any type of controller. In one embodiment, for example, the controller 140 is a processor. The processor may be, for example, a central processing unit (CPU), a graphical processing unit (GPU), a microcontroller, an application specific integrated circuit (ASIC), a field programmable gate array (FPGA), a microcontroller, or any other type of logic device or any combination thereof. The controller 140 may utilize any combination of hardware, software and firmware to control the NTE display 100.

The support arms 110 and 120 can be any curved shape. In one embodiment, for example, the support arms 110 and 120 are substantially circular. In other embodiments, the support arms 110 and 120 may be partially circular where there is a gap to provide clearance for a user's head. In other embodiments, for example, the support arms could be substantially elliptical or partially elliptical in shape.

The support arms 110 and 120 can be mounted on a helmet, visor, goggles, or the like. The support arms 110 and 120 are positioned to cross each other, as discussed in further detail below. The ocular assembly 130 is mounted to the support arms 110 and 120 such that the ocular assembly 130 substantially maintains a position where the support arms cross regardless of the respective positions of the support arms 110 and 120. In one embodiment, for example, a sliding mechanism may be used to substantially maintain a position of the ocular assembly 130, as discussed in further detail below. The center of curvature for the curved support arms 110 and 120 is preferably situated approximately at the center of rotation of the user's eye. One benefit of this configuration is that the eyebox (generally related to the exit pupil) of the ocular assembly 130 can be minimized.

The support arms 110 and 120 each rotate about an axis. In one embodiment, for example, each support arm 110 or 120 is rotated about its respective axis by motors 150. The motors 150 may be, for example, servo motors. In other embodiments, the motors 150 may use a combination of actuators and belts to move the curved support arms 110 and 120. The motors 150 may move their respective support arms 110 and 120 in discrete steps or continuously, depending upon a mechanical drive configuration. The support arms 110 and 120 could include optical encoder markings such that a sensor included with the ocular assembly 130 can provide positional feedback. The positional feedback provided by the sensor can be transmitted to a controller 140. The controller 140 is electrically coupled to the motors 150 and can instruct the motors to rotate the support arms 110 and 120, as discussed in further detail below. In another embodiment, a linear resistance system could be used to provide positional feedback. Each support arm 110 or 120 could include an electrode which traverses a length of a respective support arm 110 or 120. The resistance of each electrode will change depending upon where the support arms 110 and 120 cross each other. The resistance of each electrode can be received by the controller 140 and then translated into a position of each support arm 110 or 120 based upon the resistance. The controller can then use the position information to control the movement of the support arms 110 and 120 via the motors 150. The position information can also be used to control the information displayed, independent of what, if any, servo system is present.

In one embodiment, for example, the controller 140 instructs the motors 150 to move the support arms 110 and 120 to follow the movement of an eye of a user. A camera 160 can be coupled to the ocular assembly and be positioned to receive a view of a user's eye. In one embodiment, for example, the camera may be mounted to focus directly on a user's eye. In another embodiment, for example, the camera 160 could be directed toward a reflective surface of the ocular assembly 130 which is positioned to reflect an image of the user's eye. The image data is sent to the controller 140 which processes the image data to determine where the user is looking. The controller 140 may then send instructions to motors 150 to move the support arms 110 and 120 such that the ocular assembly is positioned in the user's field of view.

In one embodiment, for example, the controller 140 may be communicatively coupled to the ocular assembly 130 through the support arms 110 and 120. In this embodiment, the support arms 110 and 120 can each include an electrically conductive path from the ocular assembly 130 to the controller 140. The electrically conductive paths on the support arms 110 and 120 can act as a two-wire interface between the controller 140 and ocular assembly 130, allowing the components of the NTE display 100 to pass power, video and/or control signals therebetween. One advantage of using the support arms 110 and 120 to pass signals is that bulky cabling can be omitted from the system which could otherwise partially block the user's view.

In some embodiments the support arms 110 and 120 may be manually moveable allowing a user to position the ocular assembly 130 at a desired location. The user could also manually move the support arms 110 and 120 to a position out of the user's field of view such that the NTE display 100 does not block the user's field of view. In one embodiment, for example, the controller 140 turns off the NTE display 100 when the NTE display 100 is manually moved outside the user's field of view, and turns on the NTE display 100 when the NTE display 100 is manually moved into the user's field of view. In still other embodiments, the support arms 110 and 120 could be moved both manually and automatically, via the motors 150.

Figure 2:
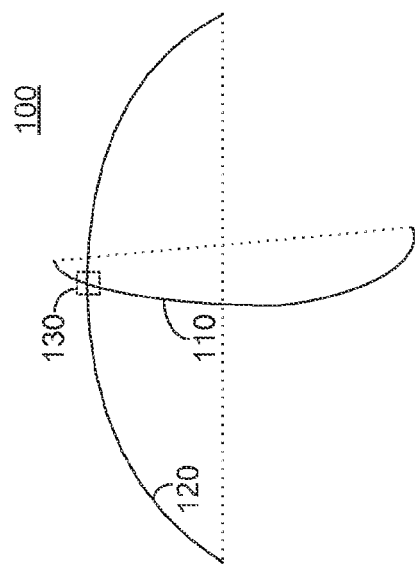
FIGS. 2-4 illustrate perspective views of an exemplary NTE display, in accordance with an embodiment.
Figure 3:
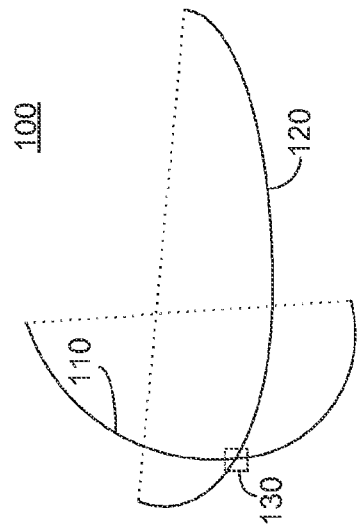
Figure 4:
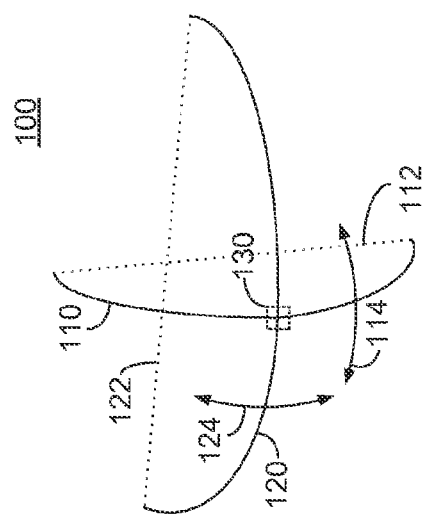

FIGS. 2-4 illustrate perspective views of an exemplary NTE display 100. As discussed above, the NTE display 100 includes two support arms 110 and 120. In the embodiment illustrated in FIG. 2, the support arm 110 is positioned substantially vertical and the support arm 120 is positioned substantially horizontally. Accordingly, in the embodiment illustrated in FIG. 2, the support arms 110 and 120 are positioned substantially perpendicular to each other. The support arms 110 and 120 may be positioned in various other orientations. The support arm geometry can be thought of as controlling the crossing point in the sense of a dual-longitude style angular coordinate system. One example of such a coordinate system might have a north-south polar axis in combination with an east-west polar axis. While distinct from a traditional latitude-longitude coordinate pair, the dual-longitude description still describes each possible orientation. Furthermore, the two axes need not be orthogonal. The relative angle between the axes can be considerably less than ninety degrees, for example by tilting the axis of rotation of support arm 110 to be closer to the axis of rotation of support arm 120 in FIG. 2. It is preferred, however, that the geometries swept by rotation of both arm 110 and arm 120 remain substantially spherical as well as concentric or identical.

As discussed above, the support arms 110 and 120 may each rotate about an axis. The support arm 110 illustrated in FIG. 2, for example, is rotatable about an axis 112 as illustrated by the arrow 114 and the support arm 120 is rotatable about an axis 122 as illustrated by the arrow 124. FIG. 3 illustrates the NTE display 100 of FIG. 2 where the support arm 110 has been rotated to the right, from the perspective of the user. As discussed above, the ocular assembly 130 is coupled to the support arms 110 and 120 such that the ocular assembly 130 substantially maintains a position at the crossing of the support arms 110 and 120. Accordingly, the image produced by the NTE display would be visible when the user is looking to the right and substantially horizontally. FIG. 4 illustrates the NTE display 100 of FIG. 2 where the support arm 120 has been rotated upwards. Accordingly, the image produced by the NTE display 100 would be visible when the user is looking to up and straight ahead. While FIGS. 3 and 4 only illustrated one of the support arms 110 and 120 being rotated, both support arms 110 and 120 can be rotated to provide a large field of regard to a user. The ocular 130 is shown as being positioned at the intersection of support arms 110 and 120, but could also be offset a distance from one or both, in any of the four quadrants of the intersection.

While the NTE display 100 discussed herein uses multiple support arms 110 and 120, in other embodiments only a single support arm may be used when only a single axis of motion is needed. In other embodiments, the second support arm 120 may be quite short and mounted only to the first support arm, and configured to slide along the length of the first support arm while maintaining a consistent angle with respect to the first support arm. If an actuator is used for moving the second support arm (including optical assembly 130) along the length in this case, that actuator could include a motor in combination with a flexible belt or other coupling mechanism.

Returning to FIG. 1, the ocular assembly 130 includes an image source. The image produced by the ocular assembly can be conformal, non-conformal or a combination thereof. The image may supplement what the user would see without the ocular assembly, overlay an entirely new image or a combination thereof. In one embodiment, for example, the ocular assembly 130 also includes at least one reflective or semi-reflective surface to direct the image towards a user's eye. The reflective or semi-reflective surface can be made of glass, plastic or the like which allows an image to be reflected therefrom while also allowing the user to see through the reflective or semi-reflective surface. Further, in one embodiment, the support arms 110 and 120 may also be made of a transparent or semi-transparent material (e.g., glass, plastic or the like), thereby minimally obstructing a user's field of view.

Figure 5:
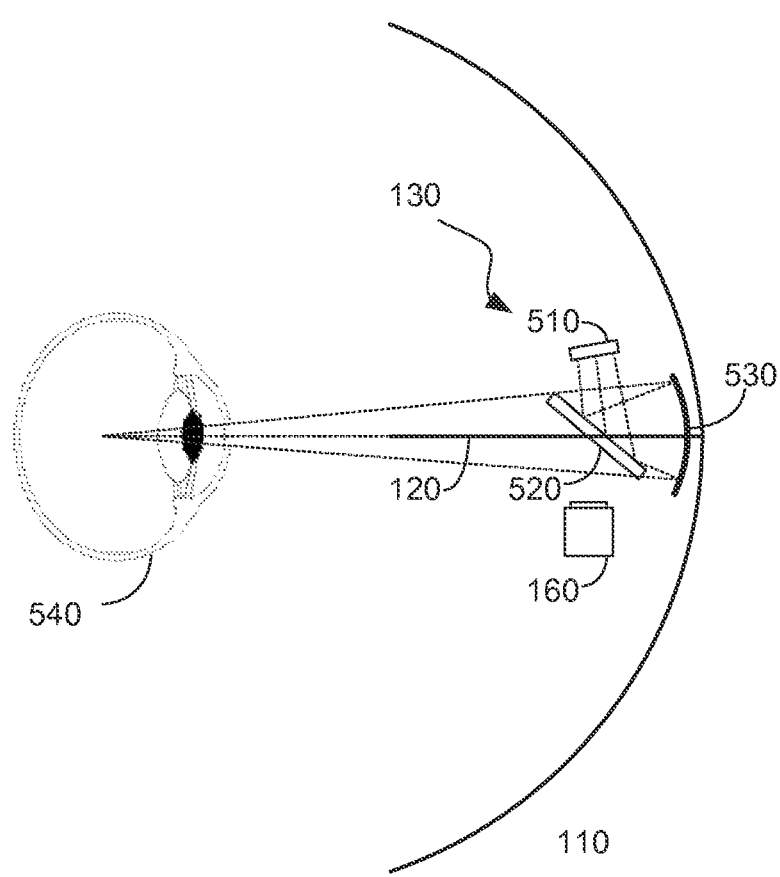
FIG. 5 illustrates a side view of an exemplary NTE display, in accordance with an embodiment.

FIG. 5 illustrates a side view of an exemplary NTE display 100. The ocular assembly 130 illustrated in FIG. 5 includes an image source 510, a beam splitter 520 and a collimating mirror 530. It should be noted that the figure is not necessarily drawn to scale.

The image source 510 is preferably a small micro display. In some embodiments, for example, an active-matrix liquid crystal display (AMLCD), a liquid crystal on silicon (LCOS) display, an organic light-emitting-diode (OLED) display or other light modulating or light emitting display devices may be used. In other embodiments, where size is less of a concern, larger display devices could be used. In one embodiment, for example, a transparent or semi-transparent OLED or other see-though micro display may be used as the image source 510. In another embodiment, for example, when the image source is transparent, or semi-transparent, the image source 510 can be positioned in front of the collimating mirror, eliminating the need for the beam splitter 520.

The image output by the image source 510 is projected or directed towards the beam splitter 520 which reflects the image to the collimating mirror 530. The collimating mirror 530 reflects the image to the user's eye 540. In another embodiment, for example, one of the support arms 110 and 120 may also be used as the collimating mirror to focus the image to the user. In yet another embodiment, for example, the collimating mirror may be replaced with a larger fixed spherical mirror (not illustrated), thereby reducing the amount of mass to be dynamically adjusted when the ocular assembly 130 is moved. The display location and any intervening optics can be adjusted to match the effective focal length of the spherical mirror. In some of the embodiments discussed herein, where the spherical mirror radius matches the radius of the support arms, the total effective path length between the image source 510 and the reflector (either a collimating mirror 530, one of the support arms 110 and 120 or the spherical mirror) should be approximately one-half the radius of the support arms 110 and 120.

As discussed above, the NTE display 100 may include a camera 160 to track a position of a user's eye 540. In the embodiment illustrated in FIG. 5, the camera 160 is aimed towards the beam splitter 520. The beam splitter 520 is positioned to reflect an image of the user's eye 540, which can then be received by the camera 160.

Figure 6:
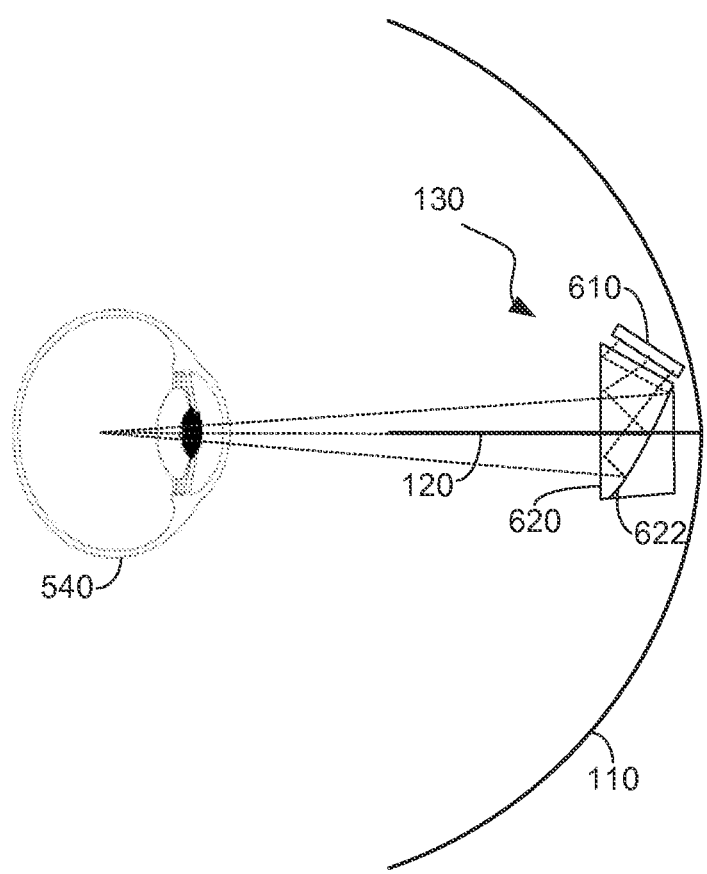
FIG. 6 illustrates a side view of another exemplary NTE display, in accordance with another embodiment.

FIG. 6 illustrates a side view of another exemplary NTE display 100. The ocular assembly 130 illustrated in FIG. 6 includes an image source 610 and a prism assembly 620. The image source 610 produces an image which is directed towards the prism assembly 620. The prism assembly 620 acts as a collimator and reflects the image towards the user's eye 540 while at the same time providing a good see-through performance. The prism assembly includes a curved internal combiner surface 622 from which the rays reflect toward the eye. The extra section to the right of the internal combiner surface 622 provides undeflected see-through.

In other embodiments, the ocular assembly may utilize a refractive collimator, a waveguide-based combiner system, a catadioptric system or other systems as known in the art.

Figure 7:
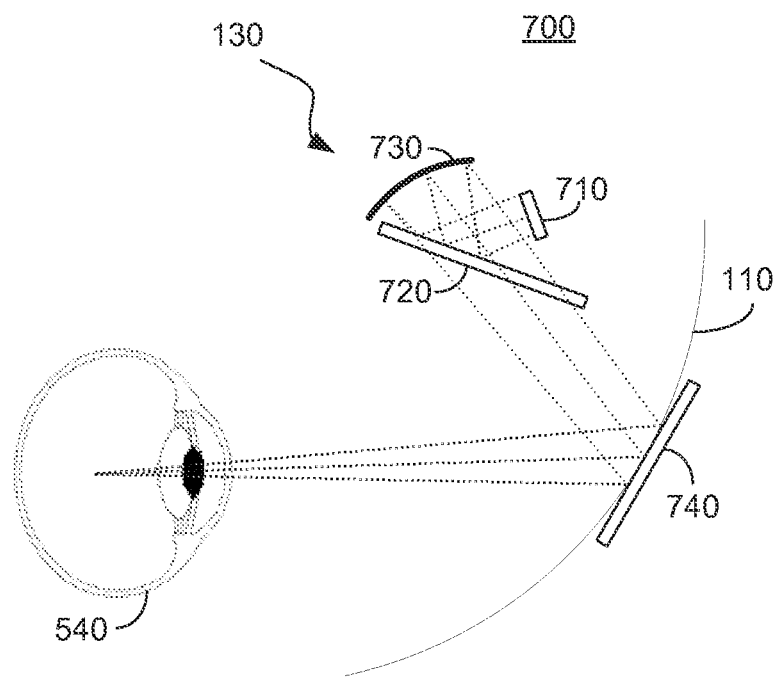
FIG. 7 illustrates a side view of yet another exemplary NTE display.

Other mechanisms to move the ocular assembly 130 across a user's field of view may be used. For example, multi-bar linkages, multiple solenoid or other linear actuators or galvanometers. FIG. 7, for example, illustrates a side view of yet another exemplary NTE display 700 NTE display 700 includes a single support arm 110 and an ocular assembly 130. The ocular assembly 130 includes an image source 710, a beam splitter 720 and a first collimating mirror 730. The image source 710, beam splitter 720 and first collimating mirror 730 are rotatable about an axis. The controller 140 connected to the ocular assembly 130 rotates the image source 710, beam splitter 720 and first collimating mirror 730 such that an image is projected towards a second collimating mirror 740. The second collimating mirror 740 is movable along the support arm 110. The ocular assembly 130 may be automatically controlled via motors 150 and a camera 160 in a similar manner as discussed above, manually controllable, or a combination thereof. In another embodiment, for example, multiple collimating mirrors 740 may be fixed along the support arm 110. In this embodiment, the image source 710, beam splitter 720 and first collimating mirror 730 can be rotated to project an image towards any of the multiple collimating mirrors 740 to project the image towards a desired location. In other exemplary embodiments, mirror 740 can be made as a flat mirror or combiner, as this has the benefit that the collimation optics do not have to dynamically adjust for aberrations associated with an off-axis curved combiner. In yet other embodiments, the orientation of mirror 740 can be controlled by rocking or translating mirror 740 tangentially along an ellipsoidal path associated with support arm 110, to ensure the correct angle for directing the displayed light toward the pupil of the eye.

Returning to FIG. 1, the NTE display 100 may further include at least one clamping mechanism 170. In one embodiment, for example, the support arms 110 and 120 and the ocular assembly 130 may each have a clamping mechanism 170 coupled thereto. In other embodiments, for example, only the support arms 110 and 120 may include a clamping mechanism 170. The clamping mechanism 170 fixes the position of the respective support arms 110 and 120 and ocular assembly 130 to minimize vibrations and other unintended motion of the respective components. The clamping mechanism may utilize any type of motion dampening technology, for example, electromechanical, electromagnetic or electrostatic. One benefit of the embodiment, for example, is that by clamping the support arms 110 and 120 and the ocular assembly 130 in place, the NTE display 100 does not have to waste any power utilizing the motors 150 to hold the components in place.

Further, in one embodiment, for example, support arms 110 and 120 each include a counter weight 180. The counter weights 180 can be placed to manage and partially counteract inertial effects associated with the movement of the support arms 110 and 120 due to the motors 150 or from manual movement.

The NTE display 100 may also include an enclosure 190. The enclosure can enclose some of, or all of, the support arms 110 and 120, the ocular assembly 130, the clamping mechanisms 170 and the counterweights 180. In one embodiment, for example, the enclosure 190 includes two curved transparent surfaces where some or all of the components of the NTE display 100 are enclosed therein. The curve may substantially match the curve of the support arms 110 and 120. In another embodiment, for example, the enclosure could be a flat surface.

In yet another embodiment, for example, the ocular assembly 130 may be coupled to the enclosure. In this embodiment, the ocular assembly could be mounted to the enclosure via a magnetic retaining piece, for example on the opposing side of the enclosure surface. The ocular assembly could then be manually moved along the surface of the enclosure 190. Bearings, or other low friction sliders, could be coupled to the ocular assembly 130 to ease the movement along the surface of the enclosure.

Figure 8:
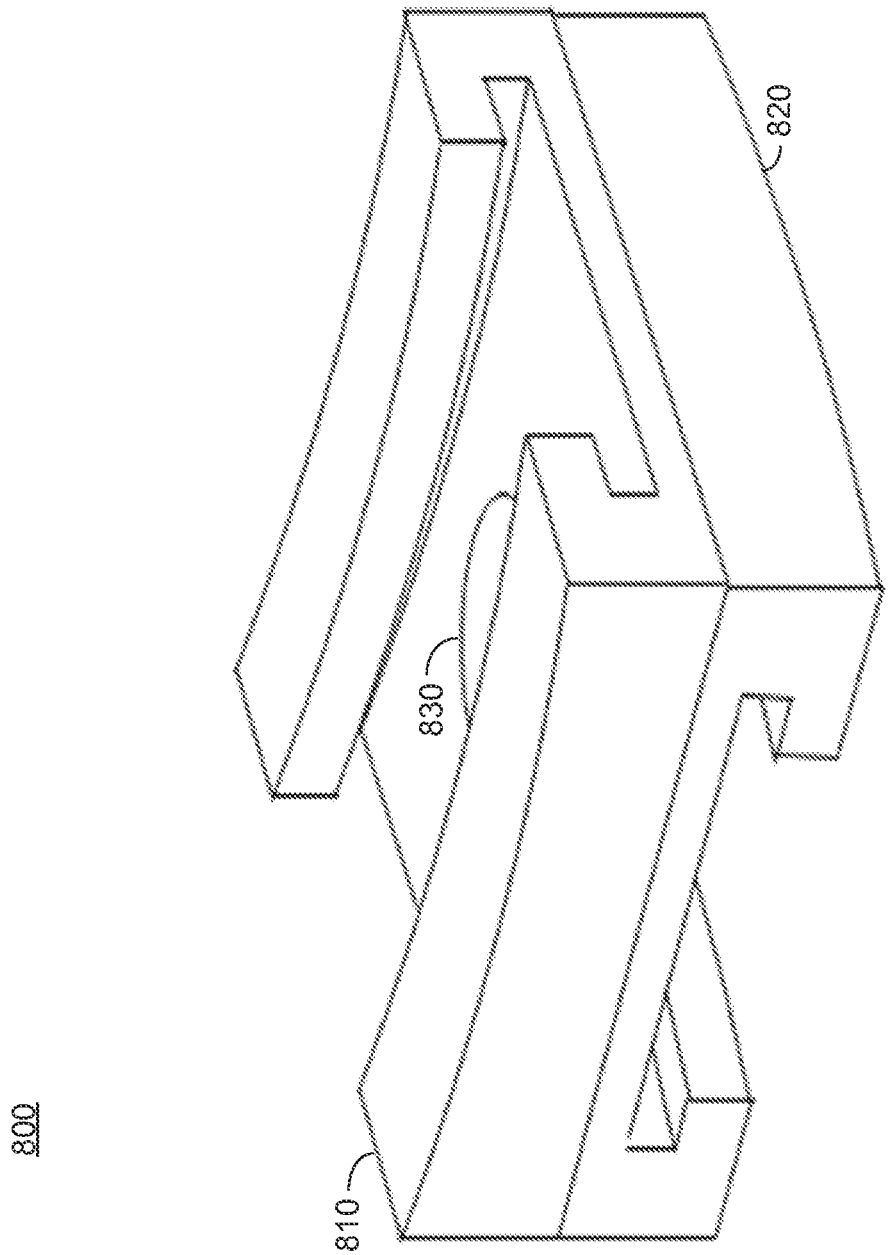
FIG. 8 illustrates a perspective view of an exemplary sliding mechanism, in accordance with an embodiment.

As discussed above, the ocular assembly 130 may include a sliding mechanism to substantially maintain a position of the ocular assembly at a position along one or more of the support arms 110 and 120. FIG. 8 illustrates an exemplary sliding mechanism 800. The sliding mechanism 800 includes brackets 810 and 820 for coupling to the support arms 110 and 120. The sliding mechanism 800 further includes a pin mechanism 830 to enable relative rotation about the pin mechanism 830 between the two brackets 810 and 820. In one embodiment, for example, the ocular assembly 130 could attach to (or be an extension of) one of these two brackets 810 and 820. In the embodiment illustrated in FIG. 8, the channel of each bracket 810 and 820 are curved to match the curvatures of the two support arms 110 and 120. However, in other embodiments, the channels could be straight.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A steerable near-to-eye display, comprising:
 a first curved support arm configured to rotate about a first axis;
 a second support arm configured to rotate about a second axis; and
 an ocular assembly coupled to at least one of the first curved support arm and the second support arm, the ocular assembly configured to display an image and configured to substantially maintain a position where the first curved support arm crosses the second support arm.

2. The steerable near-to-eye display of claim 1, further comprising a controller configured to control the image displayed by the ocular assembly.

3. The steerable near-to-eye display of claim 2, wherein the second support arm is a second curved support arm, the steerable near-to-eye display further comprising:
 a first motor coupled to the first curved support arm and configured to rotate the first curved support arm about the first axis; and
 a second motor coupled to the second curved support arm and configured to rotate the second curved support arm about the second axis,
 wherein the controller is further configured to control the first and second motors.

4. The steerable near-to-eye display of claim 3, further comprising:
 a camera configured to transmit eye positional image data to the controller, wherein the controller is further configured to:
  process the eye positional image data to determine a position of a user's eye; and
  instruct the first and second motors to rotate the first and second curved support arms such that the ocular assembly is positioned where the user's eye is directed.

5. The steerable near-to-eye display of claim 4, wherein the ocular assembly further comprises:
 an image source configured to project an image;
 a beam splitter configured to receive the image projected from the image source and to reflect the received image; and
 a collimating mirror configured to receive the image reflected from the beam splitter and further configured to reflect the image towards a center of rotation of the first and second curved support arms.

6. The steerable near-to-eye display of claim 5, where the camera is configured to receive the eye positional image data from a reflection off the beam splitter.

7. The steerable near-to-eye display of claim 2, wherein the first curved support arm further comprises a first electrically conductive path, and the second support arm further comprises a second electrically conductive path and the first and second electrically conductive paths electrically couple the controller to the ocular assembly.

8. The steerable near-to-eye display of claim 1, wherein the first curved support arm and the second support arm are at least partially transparent.

9. A near-to-eye display system, comprising:
 a first circular support arm configured to rotate about a first axis;
 a second circular support arm configured to rotate about a second axis; and
 an ocular assembly coupled to at least one of the first circular support arm and the second circular support arm, the ocular assembly configured to display an image and configured to substantially maintain a position where the first circular support arm crosses the second circular support arm.

10. The near-to-eye display system of claim 9, wherein the first axis is substantially perpendicular to the second axis.

11. The near-to-eye display system of claim 10, wherein the first circular support arm is oriented substantially vertically.

12. The near-to-eye display system of claim 9, wherein the ocular assembly further comprises:
 an image source configured to project an image; and
 a collimating mirror to reflect the image towards a center of the first and second circular support arms.

13. The near-to-eye display system of claim 12, wherein one of the first and second circular support arms is the collimating mirror.

14. The near-to-eye display system of claim 12 wherein a total path length between the image source and the collimating mirror is approximately half the radius of the first circular support arm.

15. The near-to-eye display system of claim 12, wherein the image source is at least partially transparent.

16. The near-to-eye display system of claim 9, wherein the first circular support arm and the second circular support arm are configured to be rotated manually.

17. A near-to-eye display system, comprising:
 a first partially circular support arm configured to rotate about a first axis;
 a second partially circular support arm configured to rotate about a second axis;
 an ocular assembly coupled to at least one of the first partially circular support arm and the second partially circular support arm, the ocular assembly configured to display an image and configured to substantially maintain a position where the first partially circular support arm crosses the second partially circular support arm;

a first motor coupled to the first partially circular support arm and configured to rotate the first partially circular support arm about the first axis;

a second motor coupled to the second partially circular support arm and configured to rotate the second partially circular support arm about the second axis; and a controller coupled to the first and second motors and configured to control a rotation of the first partially circular support arm and the second partially circular support arm.

18. The near-to-eye display system of claim 17, further comprising a clamping mechanism configured to reduce unintentional movement of the ocular assembly.

19. The near-to-eye display system of claim 17, further comprising a first counterweight coupled to the first partially circular support arm and a second counterweight coupled to the second partially circular support arm.

20. The near-to-eye display system of claim 17, further comprising a transparent enclosure, wherein the first partially circular support arm, the second partially circular support arm and the ocular assembly are enclosed by the transparent enclosure.

* * * * *